United States Patent
Colby

(10) Patent No.: US 9,423,034 B2
(45) Date of Patent: Aug. 23, 2016

(54) LOCKING POPPET VALVE

(71) Applicant: Luke S. Colby, Concord, MA (US)

(72) Inventor: Luke S. Colby, Concord, MA (US)

( * ) Notice: Subject to any disclaimer, the term of this patent is extended or adjusted under 35 U.S.C. 154(b) by 358 days.

(21) Appl. No.: 14/282,834

(22) Filed: May 20, 2014

(65) Prior Publication Data

US 2015/0020893 A1     Jan. 22, 2015

Related U.S. Application Data

(60) Provisional application No. 61/856,920, filed on Jul. 22, 2013.

(51) Int. Cl.
| | |
|---|---|
| F15B 13/01 | (2006.01) |
| F16K 1/12 | (2006.01) |
| F16K 31/122 | (2006.01) |
| F15B 15/19 | (2006.01) |
| F15B 15/26 | (2006.01) |

(52) U.S. Cl.
CPC ............. F16K 1/126 (2013.01); F16K 31/122 (2013.01); *F15B 15/19* (2013.01); *F15B 15/261* (2013.01); *Y10T 137/1647* (2015.04)

(58) Field of Classification Search
CPC ............. F16K 1/126; Y10T 137/1647; Y10T 137/2267; Y10T 137/6089; Y10T 137/7131; Y10T 137/7225; Y10T 137/87193; F15B 15/19; F15B 15/261
USPC ................ 137/68.13, 315.04, 315.35, 384.2, 137/384.8, 596.14, 222, 219, 221; 251/26, 251/29, 32, 49, 54, 89, 90, 62, 75, 102, 297
See application file for complete search history.

(56) References Cited

U.S. PATENT DOCUMENTS

| | | | | |
|---|---|---|---|---|
| 1,629,957 A * | 5/1927 | Larner | .................... | F16K 1/126 137/221 |
| 2,192,499 A * | 3/1940 | Larner | ...................... | F16K 1/12 137/222 |
| 2,875,976 A * | 3/1959 | Harwood | ............... | B64D 13/02 251/102 |
| 2,925,984 A * | 2/1960 | Kowalski | ................ | F16K 31/40 251/26 |
| 2,943,636 A * | 7/1960 | Reed | ......................... | E03B 9/04 137/220 |
| 3,111,133 A * | 11/1963 | Fulton | ..................... | E21B 29/08 137/68.13 |
| 3,119,405 A * | 1/1964 | Guy | ........................ | F16K 1/126 137/219 |
| 3,122,154 A * | 2/1964 | Siebel | ..................... | F16K 13/06 137/68.13 |
| 3,174,500 A * | 3/1965 | Johnson | .................. | C01G 43/06 137/116.3 |
| 3,286,725 A * | 11/1966 | Elbogen | .................... | B64F 1/28 137/220 |
| 3,307,786 A * | 3/1967 | Salerno | ................... | F16K 1/126 137/489.5 |

(Continued)

*Primary Examiner* — Kevin Murphy
*Assistant Examiner* — Minh Le

(57) ABSTRACT

A locking poppet valve that is reusable and can be pyrotechnically actuated includes an actuating mechanism and a valve assembly that are in fluid communication. A fluid channel traverses through a valve body and fluidly connects the actuating mechanism to a poppet valve positioned within the valve body. When the actuating mechanism is fired, a piston is displaced within an actuator housing, which in turn displaces hydraulic fluid within the actuator housing and the fluid channel. The displaced hydraulic fluid acts to push a valve spool along a valve stem, opening the poppet valve and allowing fluid to flow through the valve body. Additionally, the piston is held in a fired position by a locking mechanism, such that the poppet valve remains open. The poppet valve can be reset by disengaging the locking mechanism and allowing the hydraulic fluid to re-displace within the fluid channel and the actuator housing.

18 Claims, 13 Drawing Sheets

(56) References Cited

U.S. PATENT DOCUMENTS

| | | | | |
|---|---|---|---|---|
| 3,359,998 A * | 12/1967 | Fike | ............... | F16K 1/126 137/220 |
| 3,511,183 A * | 5/1970 | Geffner | ............... | F42C 15/00 102/229 |
| 3,540,464 A * | 11/1970 | Renzi | ............... | F02C 7/047 137/221 |
| 3,566,907 A * | 3/1971 | Sime | ............... | F16K 1/126 137/219 |
| 3,602,245 A * | 8/1971 | Meisel | ............... | F16H 63/38 137/270 |
| 3,650,506 A * | 3/1972 | Bruton | ............... | F16K 31/1635 251/26 |
| 3,665,813 A * | 5/1972 | Loveless | ............... | F15B 15/261 92/30 |
| 3,802,459 A * | 4/1974 | Geraudie | ............... | F16K 17/168 137/384.6 |
| 3,890,824 A * | 6/1975 | Camion | ............... | F01B 17/00 72/453.11 |
| 3,896,840 A * | 7/1975 | Andersson | ............... | F16K 1/126 137/219 |
| 4,141,534 A * | 2/1979 | Goga | ............... | F16K 1/126 137/219 |
| 4,206,902 A * | 6/1980 | Barthel | ............... | F16K 1/126 138/30 |
| 4,614,097 A * | 9/1986 | Signorelli | ............... | E05B 67/365 70/34 |
| 4,635,536 A * | 1/1987 | Liu | ............... | F15B 15/261 92/24 |
| 4,844,412 A * | 7/1989 | Kubozono | ............... | F16K 11/0704 137/625.69 |
| 4,946,130 A * | 8/1990 | Kooiman | ............... | F16K 31/56 251/100 |
| 7,055,542 B2 * | 6/2006 | Delobel | ............... | F16K 1/126 137/219 |
| 7,451,688 B2 * | 11/2008 | Takahashi | ............... | F15B 15/261 92/14 |
| 7,493,914 B2 * | 2/2009 | Welker | ............... | B63H 11/117 137/219 |
| 8,011,639 B2 * | 9/2011 | McCausland | ............... | F16K 1/126 251/31 |
| 8,567,758 B2 * | 10/2013 | Bouten | ............... | F15B 13/0402 251/129.07 |
| 8,733,387 B2 * | 5/2014 | Kolacz | ............... | A62C 33/00 137/221 |
| 8,910,653 B2 * | 12/2014 | McAuliffe | ............... | F16K 31/12 137/220 |
| 8,931,504 B2 * | 1/2015 | Canjuga | ............... | F16K 1/126 137/220 |

* cited by examiner

LOCKING POPPET VALVE

The current application claims a priority to the U.S. Provisional Patent application Ser. No. 61/856,920 filed on Jul. 22, 2013.

FIELD OF THE INVENTION

The present invention relates generally to a valve. More specifically, the present invention is a one way flow valve having an externally mounted actuator. Furthermore, the valve and actuator are designed for repeated use.

BACKGROUND OF THE INVENTION

A typical, normally closed pyrotechnic valve utilizes a pyro initiator and a destructible membrane, pin or similar structure. When the pyro initiator is activated, oftentimes by an electrical signal, pyrotechnic gases combust within a chamber to which the pyro initiator is attached. The combustion of the pyrotechnic gases within the chamber creates a driving force which acts upon a movable component such as a piston. Movement of the piston either directly or indirectly breaks the destructible membrane, which then opens the flow path through the valve. In some cases the pyrotechnic gases may act directly on the membrane. As the membrane is destroyed in the process of opening the flow path, these valves are designed for a single use. While the membranes in these valves can be replaced, the process of refurbishing the valves can be both costly and time consuming. Another issue with these types of valves is that they present the potential issue of contaminating the flow path with the pyrotechnic gases, which could have harmful results.

Therefore it is the object of the present invention to provide a valve that can be pyrotechnically actuated and that is reusable. Furthermore, the valve is designed to prevent any potential contamination of the flow path. A pyrotechnic actuating mechanism is attached to and is in fluid communication with a valve assembly. When a pyro initiator of the actuating mechanism is fired, a driving force is produced that moves a piston. Once the piston travels a predetermined distance, it is locked in place by a locking mechanism, Movement of the piston displaces hydraulic fluid in both the actuating mechanism and the valve assembly, which in turn forces a poppet valve open, thus opening the flow path. By disengaging the locking mechanism, the piston can be reset, allowing the hydraulic fluid to displace and the poppet valve to close. The pyro initiator acts only on the piston, which in turn displaces the hydraulic fluid. The hydraulic fluid is separated from the valve assembly flow path; therefore, it is not possible for any pyrotechnic gases to contaminate the flow path.

DETAIL DESCRIPTIONS OF THE INVENTION

All illustrations of the drawings are for the purpose of describing selected versions of the present invention and are not intended to limit the scope of the present invention.

The present invention is a locking poppet valve. The locking poppet valve comprises a valve assembly 10, an actuating mechanism 20, a hydraulic fluid 30, and a actuator mounting assembly 40. The actuating mechanism 20 and the valve assembly 10 are in fluid communication with each other through a closed pathway filled with the hydraulic fluid 30. The use of hydraulic fluid 30 in a closed system prevents possible contamination of the flow path by the pyrotechnic gases. In the preferred embodiment of the present invention, the locking poppet valve is a normally closed valve; however, the locking poppet valve can also be adapted to a normally open valve. While the locking poppet valve is designed for use in aerospace applications in the preferred embodiment, the present invention can be applied in any other field.

Figure 1:
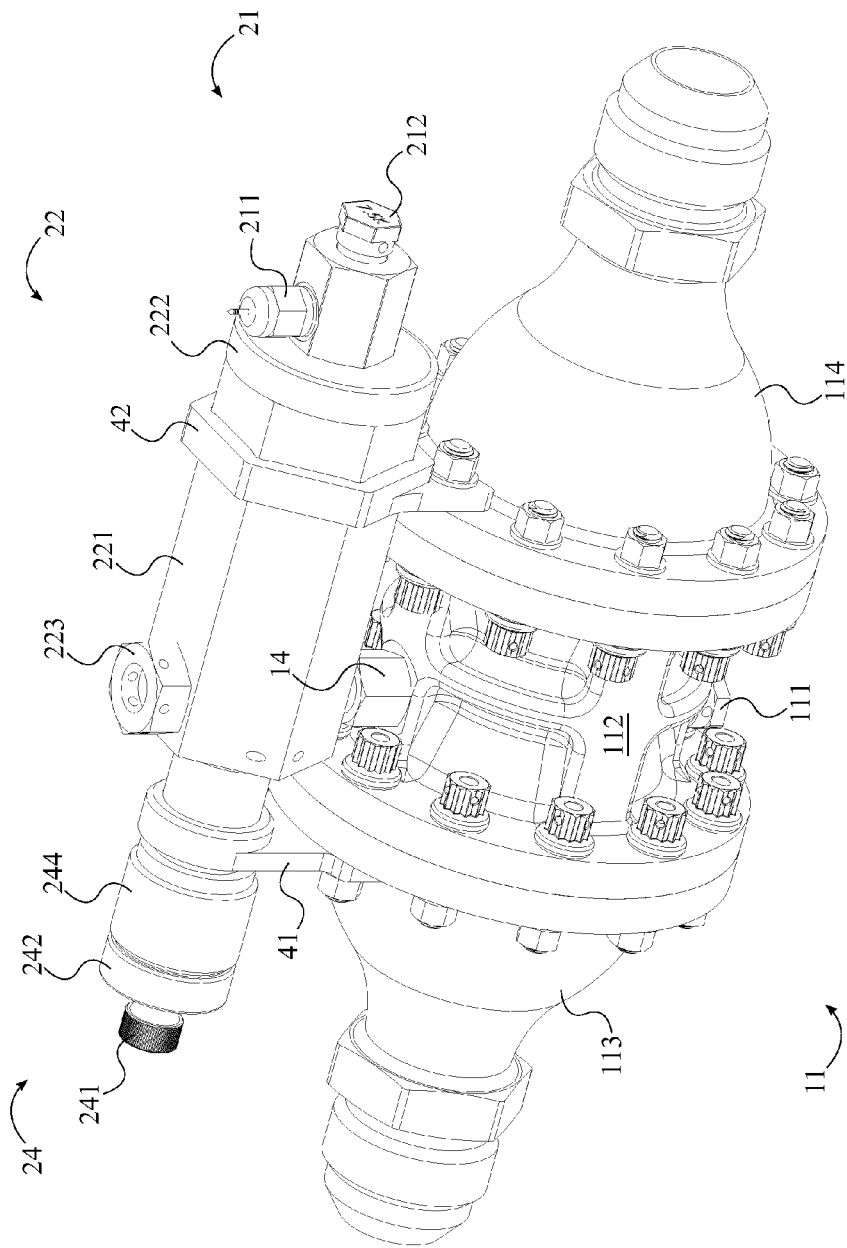
FIG. 1 is a perspective view of the present invention.
Figure 9:
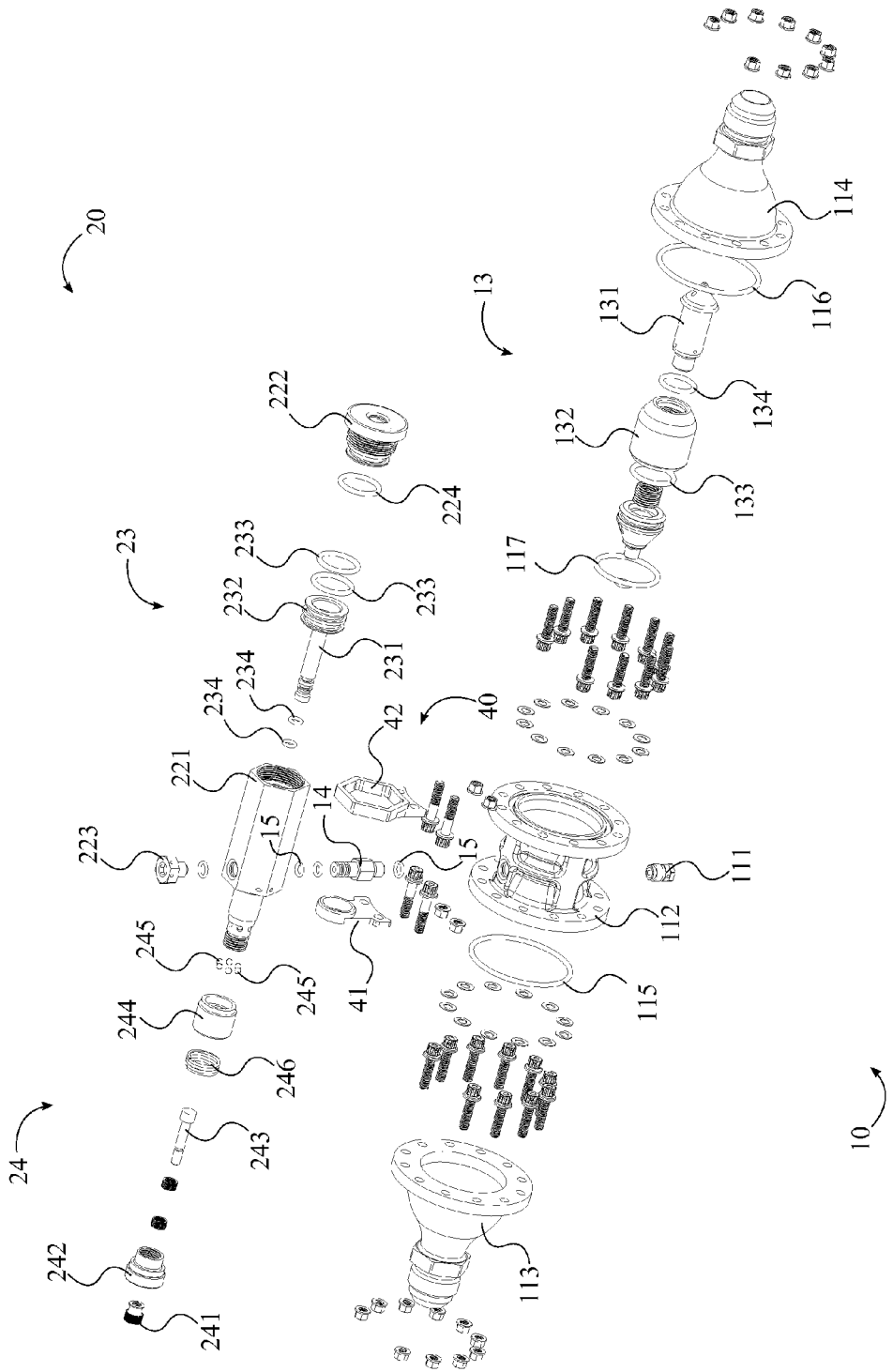
FIG. 9 is an exploded view thereof.
Figure 10:
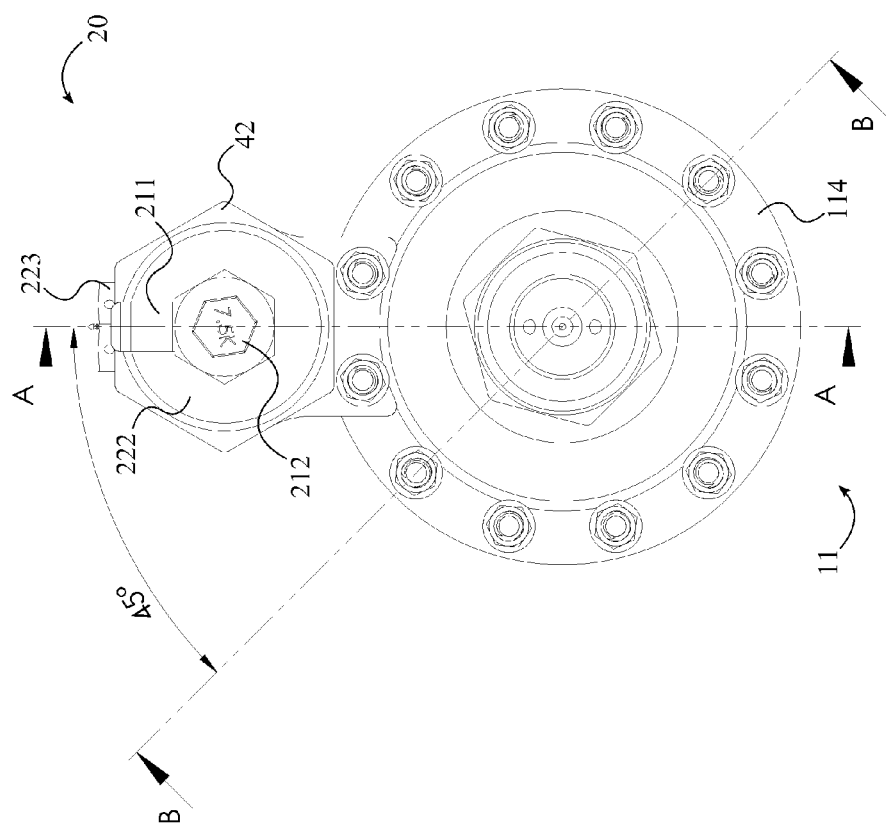
FIG. 10 is right side elevational view of the present invention with the initiator attached to the actuator housing.
Figure 13:
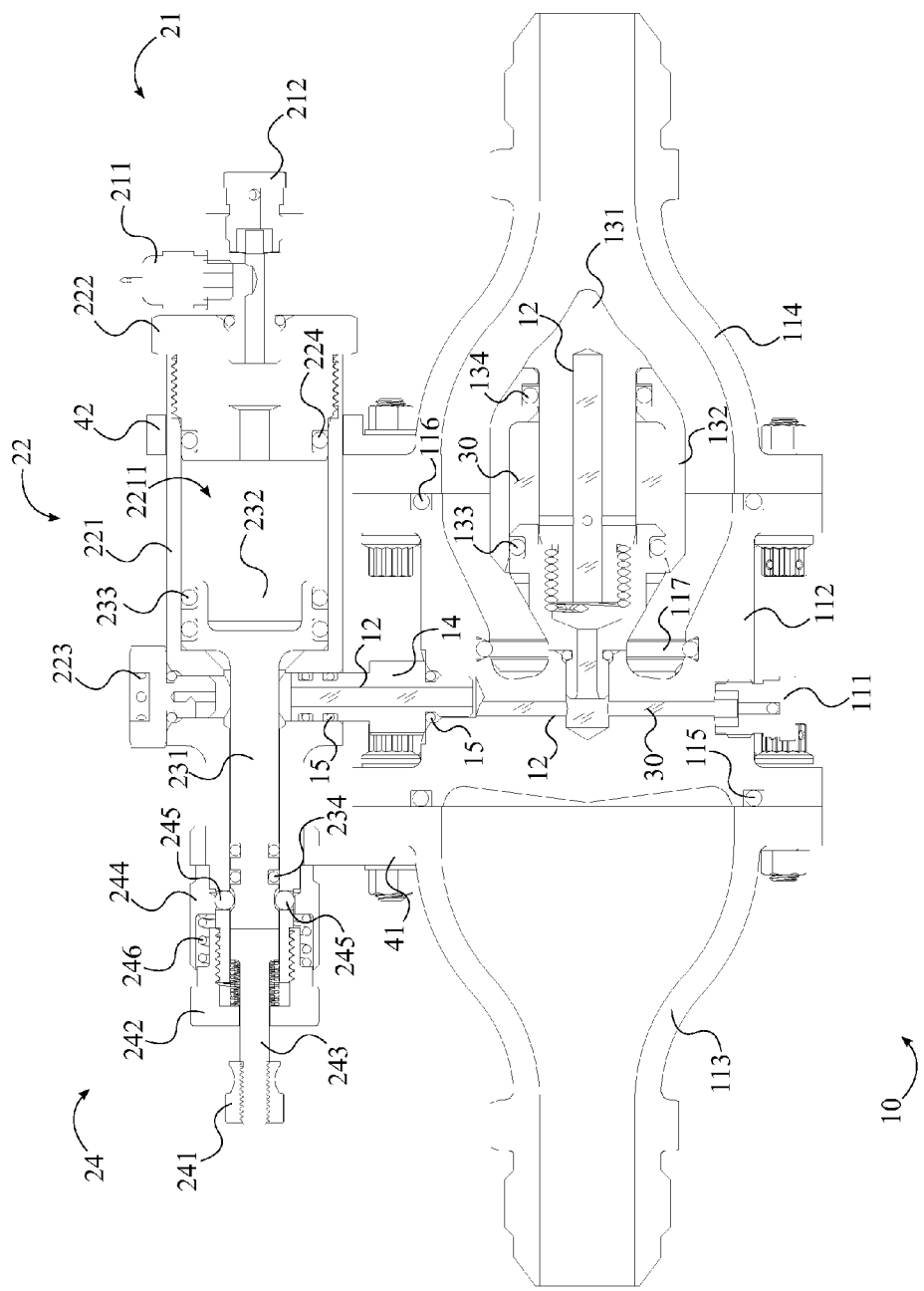
FIG. 13 is a right side sectional view thereof, about section A-A, wherein the piston is in the fired position and the poppet valve is in the open position.

In reference to FIG. 1 and FIG. 9, the actuating mechanism 20 comprises an initiator 21, an actuator housing 22, a piston 23, and a locking mechanism 24. The locking mechanism 24 is mechanically coupled to one end of the actuator housing 22, while the piston 23 is positioned within the actuator housing 22 adjacent to the locking mechanism 24. The initiator 21 is adjacently connected to the actuator housing 22 opposite the locking mechanism 24, such that the piston 23 is positioned in between the initiator 21 and the locking mechanism 24. When the initiator 21 is activated it creates a driving force that moves the piston 23 within the actuator housing 22. The piston 23 traverses through the actuator housing 22 until the piston 23 engages the locking mechanism 24, as shown in FIG. 13. Once engaged by the piston 23, the locking mechanism 24 holds the piston 23 in place until the locking mechanism 24 is disengaged by the user.

Figure 8:
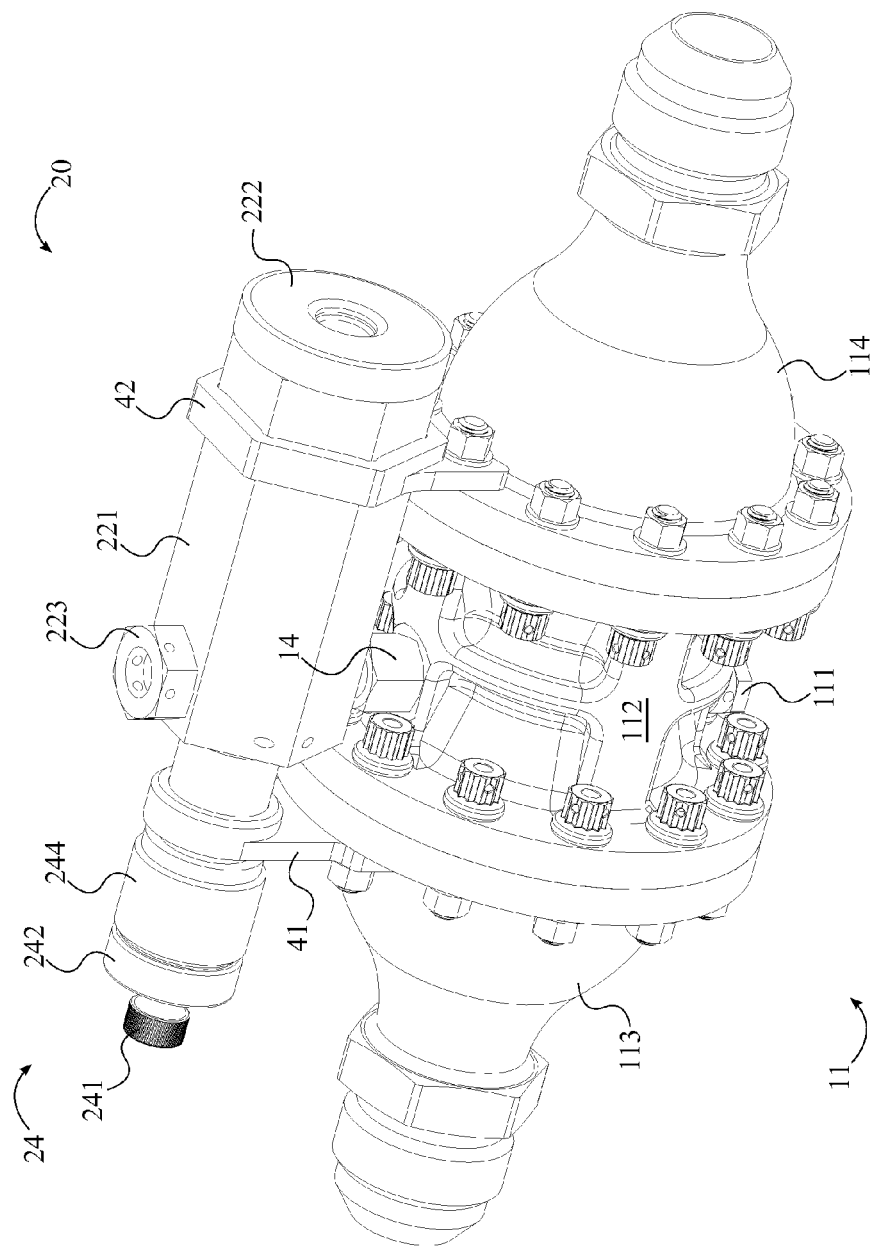
FIG. 8 is a perspective view of the present invention with the initiator removed from the actuator housing.

FIG. 8-9 show the actuating mechanism 20 in the preferred embodiment of the present invention. The actuator housing 22 comprises an actuator spool body 221, an actuator closeout cap 222, and a plug 223. The piston 23 comprises a locking rod 231 and an actuator spool 232; the locking rod 231 being concentrically connected to the actuator spool 232. The piston 23 is positioned within the actuator spool body 221 with the actuator spool 232 being positioned adjacent to the actuator closeout cap 222. The actuator spool body 221 comprises a first chamber 2211 and a second chamber 2212, wherein the actuator spool 232 is slidably positioned within the first chamber 2211 and the locking rod 231 is slidably positioned into the second chamber 2212.

The piston 23 further comprises at least one actuator spool ring 233 and at least one actuator rod ring 234. In reference to FIG. 11, the at least one actuator spool ring 233 is positioned in between the actuator spool 232 and the actuator housing 22, and creates a fluid tight seal between the actuator spool 232 and the actuator housing 22. Similarly, the at least actuator rod ring is positioned in between the locking rod 231 and the actuator housing 22, and creates a fluid tight seal between the locking rod 231 and the actuator housing 22. Preferably, the at least one actuator spool ring 233 and the at least one actuator rod ring 234 are rubber o-rings, however, any other material or seal mechanism can be used.

Figure 11:
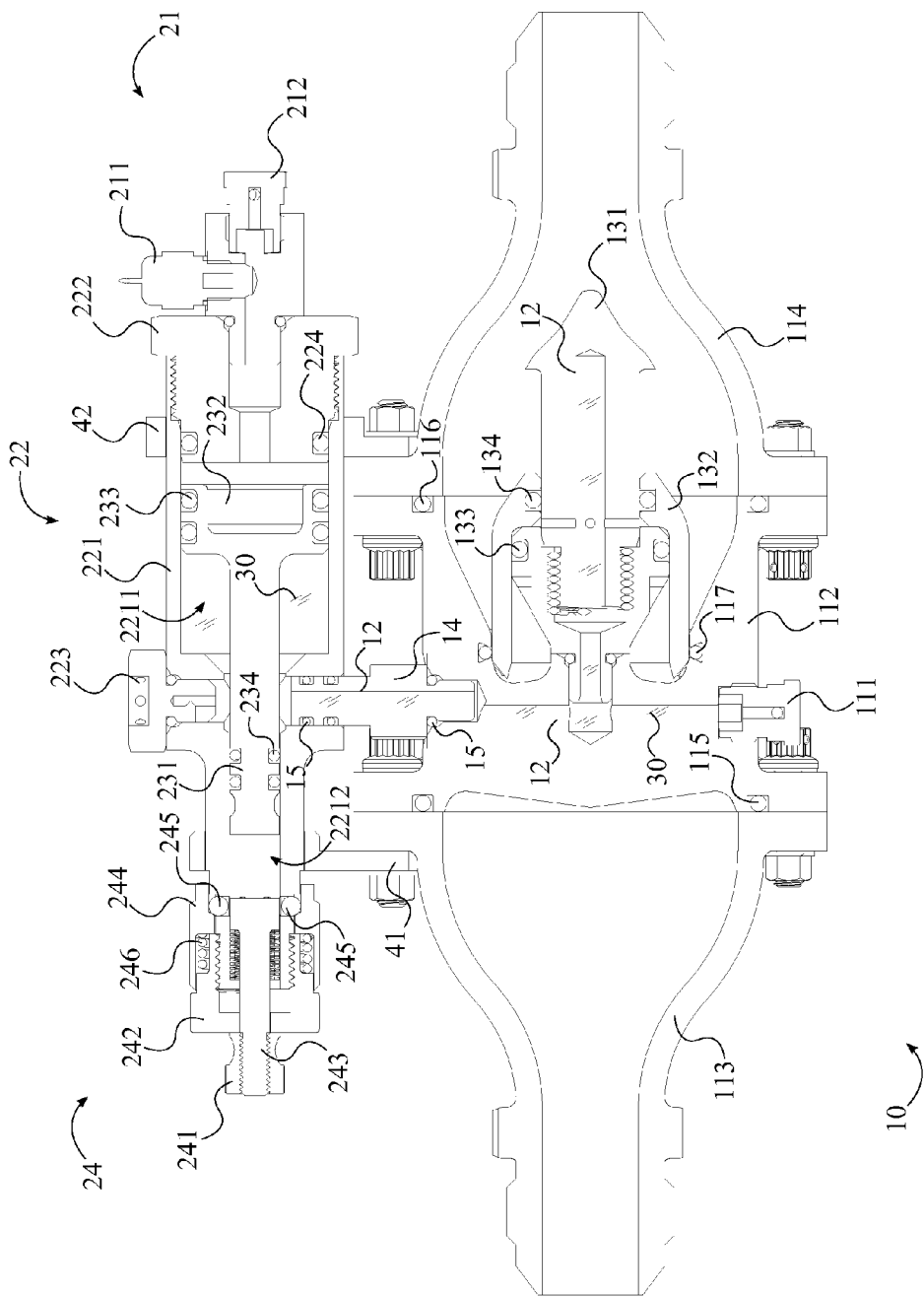
FIG. 11 is a right side sectional view thereof, about section A-A, wherein the piston is in the unfired position and the poppet valve is in the closed position.

In further reference to FIG. 11, the actuator closeout cap 222 is positioned into the first chamber 2211 and threaded onto the actuator spool body 221, enclosing the piston 23 within the actuator spool body 221. It is also possible for the actuator closeout cap 222 to be attached to the actuator spool body 221 in any other way. The actuator housing 22 further comprises a closeout cap ring 224. The closeout cap ring 224 is positioned in between the end of the actuator closeout cap 222 adjacent to the actuator spool 232 and the actuator spool body 221, and creates a fluid tight seal between the actuator closeout cap 222 and the actuator spool body 221. Preferably, the closeout cap ring 224 is a rubber o-ring, however, any other material or seal mechanism can be used.

The actuator closeout cap 222 has a hole through the center through which the initiator 21 is attached to the actuator housing 22. Preferably the hole is threaded for attaching the initiator 21, however, any other methods may also be used to attach the initiator 21 to the actuator closeout cap 222. The plug 223 is positioned in a hole through the top of the actuator spool body 221 and can be removed to provide access to the interior of the actuator spool body 221.

In reference to FIG. 9 and FIG. 11, in the preferred embodiment of the present invention, the locking mechanism 24 comprises a thumb nut 241, a ball detent locking cap 242, a locking indicator 243, a ball detent locking ring 244, a lock spring 246, and a plurality of locking balls 245. The ball detent locking ring 244 is positioned around the actuator housing 22 and is slidably connected to the actuator housing 22. More specifically, the ball detent locking ring 244 encircles the end of the actuator spool body 221 opposite the actuator closeout cap 222. The plurality of locking balls 245 traverses through the actuator housing 22, wherein each of the plurality of locking balls 245 rests within a cavity in the end of the actuator spool body 221. Additionally, the plurality of locking balls 245 is positioned around the actuator housing 22 adjacent to the ball detent locking ring 244.

Figure 2:
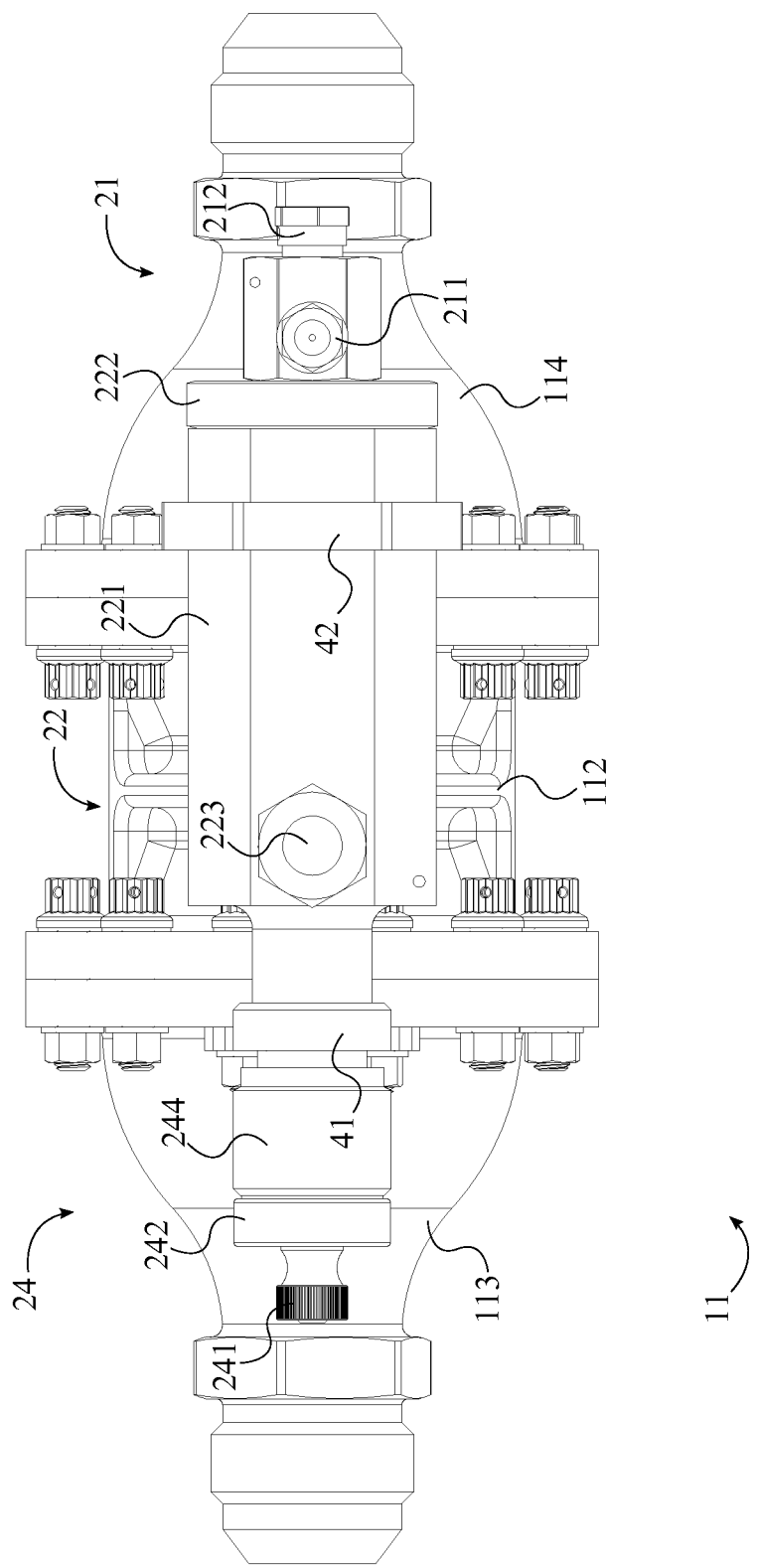
FIG. 2 is a top plan view of the present invention.

In reference to FIG. 2 and FIG. 11, the ball detent locking cap 242 is positioned onto the actuator housing 22 adjacent to the ball detent locking ring 244. Preferably the ball detent locking cap 242 is threaded onto the end of the actuator spool body 221, however, any other method can also be used to attach the ball detent locking cap 242 to the actuator spool body 221. The lock spring 246 is positioned around the actuator housing 22 and positioned in between the ball detent locking cap 242 and the ball detent locking ring 244. The lock spring 246 engages the ball detent lock ring as to apply a spring force to the ball detent locking ring 244, while the ball detent locking cap 242 secures the lock spring 246 and the ball detent locking ring 244 to the actuator spool body 221.

Figure 4:
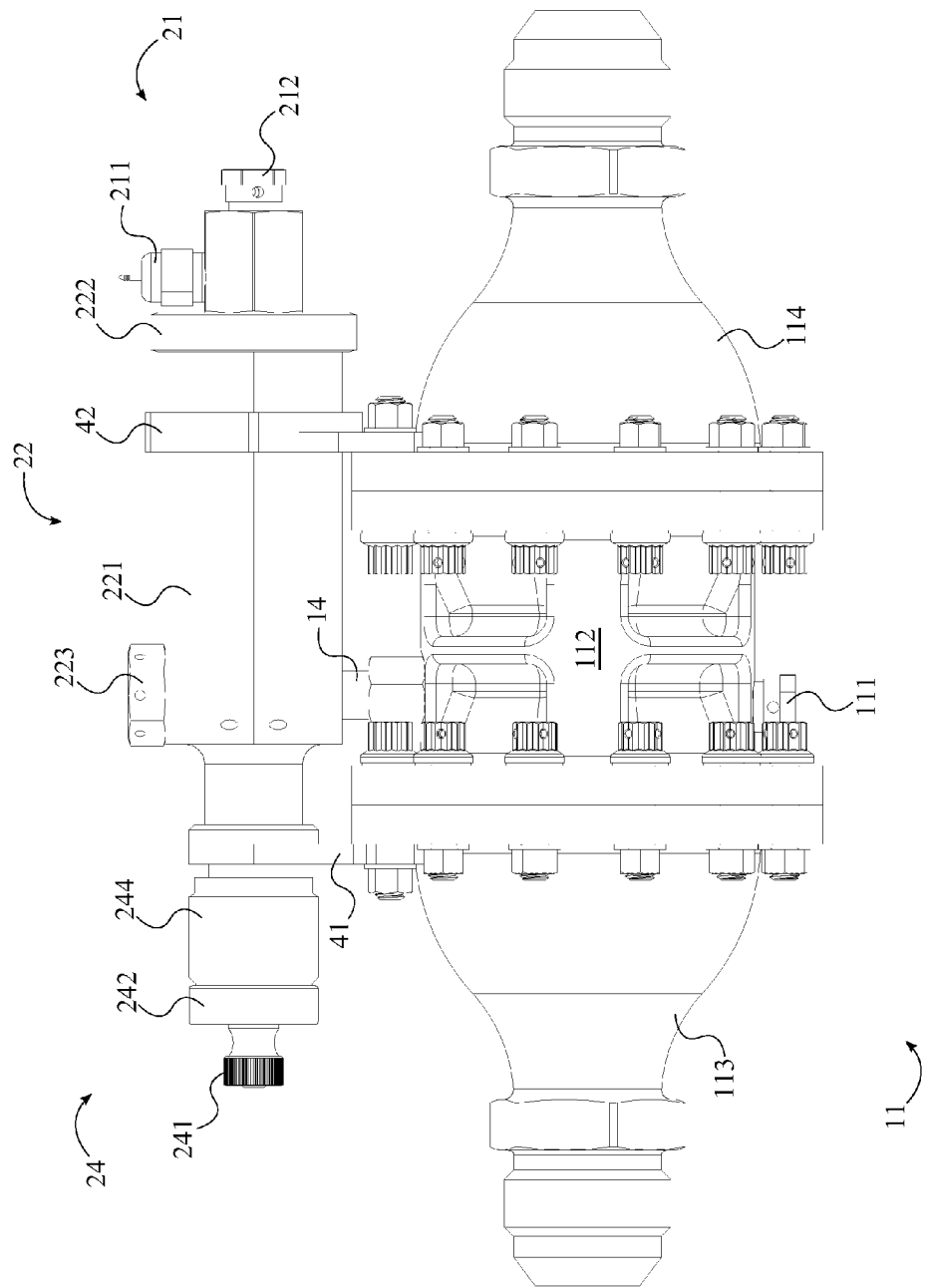
FIG. 4 is a front elevational view of the present invention, wherein the actuating mechanism has not been fired.
Figure 5:
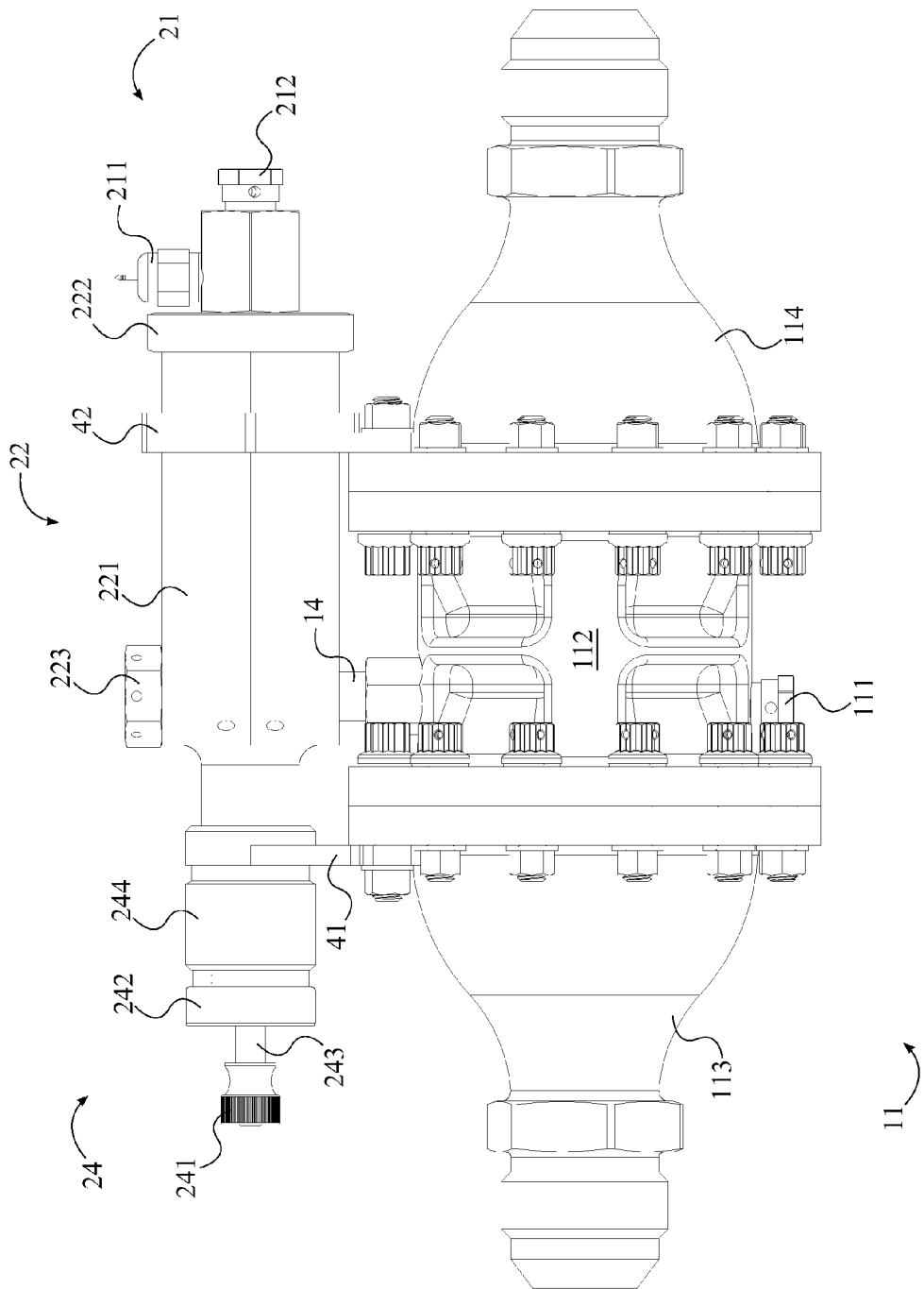
FIG. 5 is a front elevational view of the present invention after the actuating mechanism has been fired.

The locking indicator 243 is positioned into the actuator housing 22, wherein the locking indicator 243 is slidably connected to the actuator housing 22, as depicted by FIG. 4-5. More specifically, the locking indicator 243 is positioned into the second chamber 2212 of the actuator spool body 221, adjacent to the locking rod 231, as depicted in FIG. 11 and FIG. 13. The ball detent locking cap 242 secures the locking indicator 243 within the actuator spool body 221. The locking indicator 243 is also positioned through a central hole in the ball detent locking cap 242. The thumb screw is attached to the locking indicator 243 opposite of the locking rod 231 and serves as a stop, such that the locking indicator 243 does not fully enter the second chamber 2212. Additionally, the thumb nut 241 provides a means for gripping the locking indicator 243.

In reference to FIG. 1, in the preferred embodiment of the present invention, the initiator 21 is a pyrotechnic initiator and comprises a glow plug 211 and an initiator burst disk 212. The initiator burst disk 212 is positioned on the initiator 21 opposite the actuator housing 22, while the glow plug 211 is positioned in between the initiator burst disk 212 and the actuator housing 22. The actuator spool 232 divides the first chamber 2211 of the actuator spool body 221 into a first section and a second section, wherein the first section is in fluid communication with the initiator 21 through the hole in the actuator closeout cap 222.

The initiator 21 is used to drive the piston 23 from an unfired position to a fired position. In reference to FIG. 11, in the unfired position, the locking indicator 243 is positioned into the second chamber 2212, wherein the thumb screw is positioned flush against the ball detent locking cap 242. The end of the locking indicator 243 opposite the thumb screw is positioned adjacent to the plurality of locking balls 245, wherein the locking indicator 243 engages the plurality of locking balls 245, preventing the plurality of locking balls 245 from entering the second chamber 2212.

A pyrotechnic propellant is filled within the initiator 21 and the first section of the first chamber 2211, while the second chamber 2212 and the second section of the first chamber 2211 are filled with the hydraulic fluid 30. The initiator burst disk 212 prevents the initiator 21 and first section from being over-pressurized and will break open at a predetermined pressure in order to depressurize the initiator 21 and the first section. An electrical current is applied to the glow plug 211 (or an electrical signal), which in turn allows the glow plug 211 to create a spark to ignite the pyrotechnic propellant. The combustion of the pyrotechnic propellant creates a driving force that acts on the actuator spool 232, pushing the piston 23 within the actuator housing 22 towards the fired position.

In reference to FIG. 13, as the piston 23 is pushed through the actuator housing 22, the locking rod 231 engages the locking indicator 243, driving the locking indicator 243 through the ball detent locking cap 242 away from the actuator spool body 221. As the locking indicator 243 is pushed out of position, the ball detent locking ring 244 is forced in the opposite direction by the spring force of the lock spring 246. In turn, the ball detent locking ring 244 forces the plurality of locking balls 245 into a number of grooves cut into the locking rod 231, wherein the number of grooves is positioned adjacent to the pair of actuator rod rings opposite the actuator spool 232. In this way, the locking rod 231 is held in place in the fired position within the actuator spool body 221.

In reference to FIG. 11 and FIG. 13, the at least one actuator spool ring 233 creates a seal around the actuator spool 232 in order to prevent the hydraulic fluid 30 in the actuator spool body 221 from being contaminated by the pyrotechnic propellant. The at least one actuator rod ring 234 creates a seal around the end of the locking rod 231 adjacent to the locking mechanism 24 in order to prevent the hydraulic fluid 30 from the entering the portion of the second chamber 2212 in which the locking indicator 243 is positioned. The plug 223 of the actuator housing 22 is positioned adjacent to either the second chamber 2212 or the second section of the first chamber 2211, such that the plug 223 can be removed in order to replace the hydraulic fluid 30.

It is also possible for the initiator 21 to provide any other means for actuating the piston 23, such as being a pneumatic or magnetic initiator. The initiator 21 can be fired from an electronic firing pulse or other means in order to impart a driving force upon the actuator spool 232 to push the piston 23 from the unfired position, shown in FIG. 11, through the actuator spool body 221 to the fired position, shown in FIG. 13.

Figure 12:
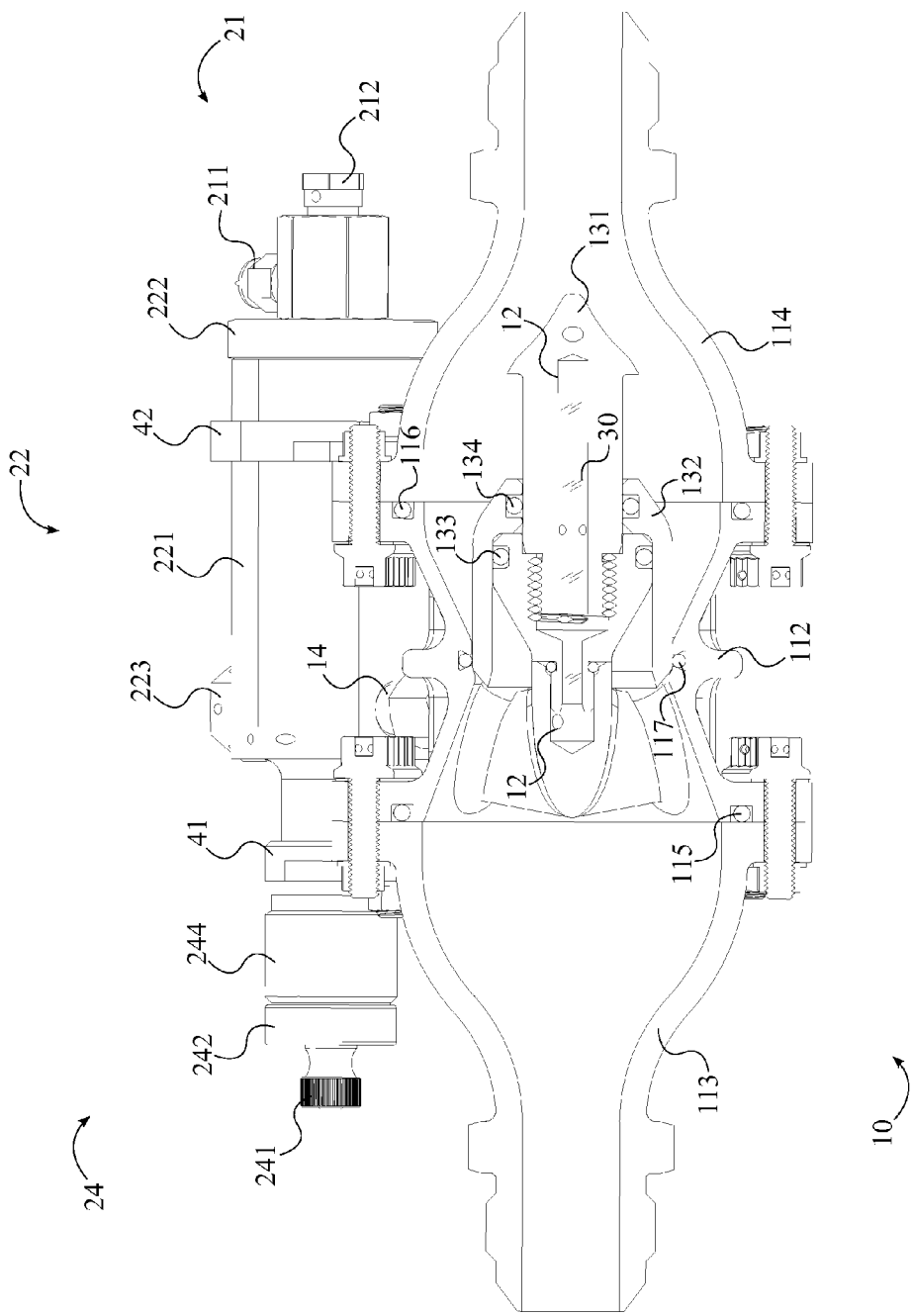
FIG. 12 is a right side sectional view thereof, about section B-B, wherein the piston is in the unfired position and the poppet valve is in the closed position.
Figure 14:
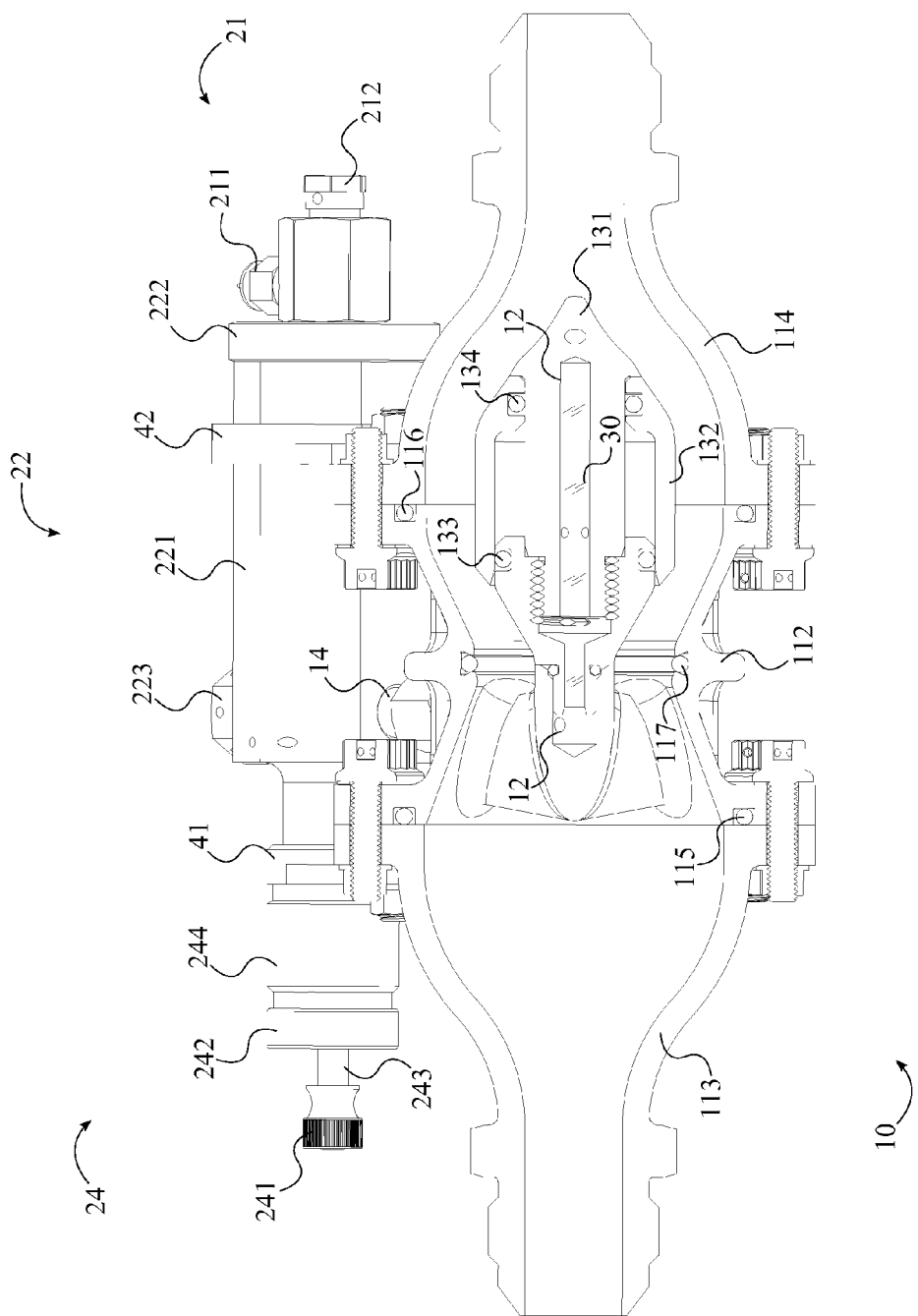
FIG. 14 is a right side sectional view thereof, about section B-B, wherein the piston is in the fired position and the poppet valve is in the open position.

In reference to FIG. 11-12, the valve assembly 10 comprises a valve housing 11, a fluid channel 12, and a poppet valve 13. The poppet valve 13 is positioned within the valve housing 11 and is in fluid communication with the actuating mechanism 20 by means of the fluid channel 12 that traverses through the valve housing 11. When the actuating mechanism 20 is fired and the piston 23 is displaced, the hydraulic fluid 30 in the actuator housing 22 and the fluid channel 12 is displaced and acts on the poppet valve 13. This in turn forces the poppet valve 13 from a closed position, as shown in FIG. 11-12, to an open position, as shown in FIG. 13-14, allowing fluid to flow through the valve housing 11. It is also possible for any other type of valve mechanism to be used.

Figure 3:
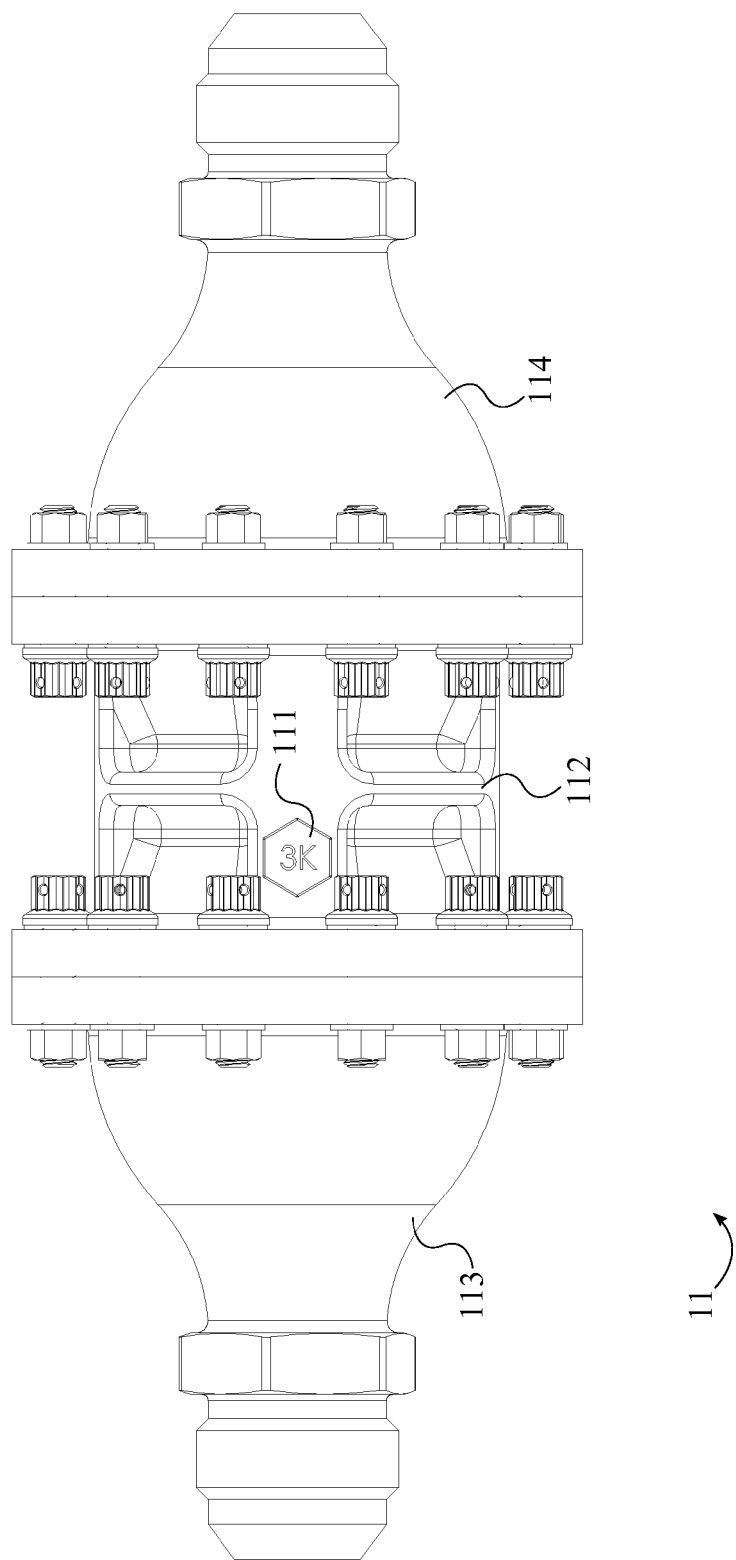
FIG. 3 is a bottom plan view of the present invention.

Referencing FIG. 3-4, in the preferred embodiment of the present invention, the valve housing 11 comprises a burst disk 111, a valve body 112, a first valve adapter 113, and a second valve adapter 114. The valve body 112 is the central section of the valve housing 11 through which the fluid channel 12 traverses and fluidly connects the poppet valve 13 and the actuating mechanism 20. The burst disk 111 is positioned into the fluid channel 12 on the bottom of the valve body 112, shown in FIG. 3, and is perimetrically connected to the valve body 112. The burst disk 111 prevents the fluid channel 12 in the valve body 112 from being over-pressurized and will break open at a predetermined pressure allowing the hydraulic fluid 30 to escape the fluid channel 12 in order to depressurize the fluid channel 12.

Figure 7:
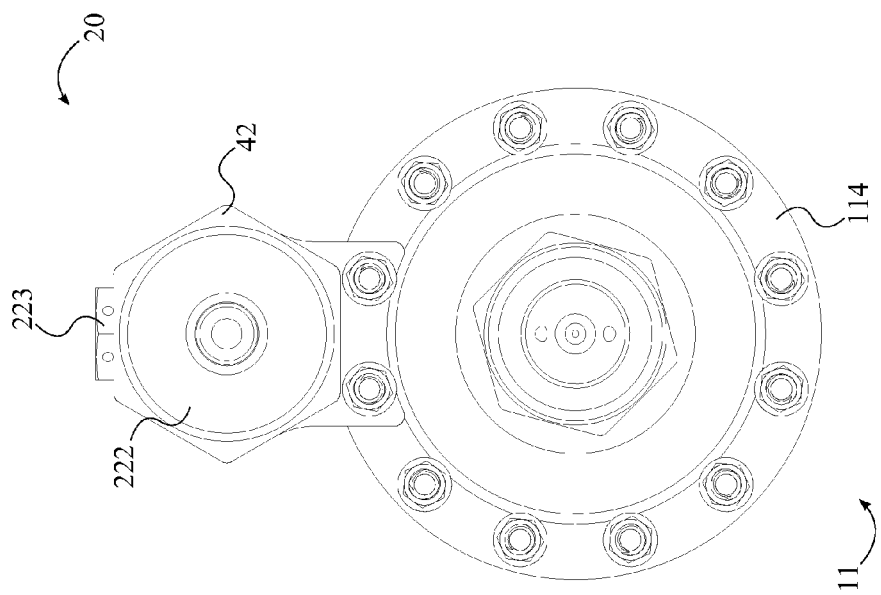
FIG. 7 is a right side elevational view of the present invention with the initiator detached from the actuator housing.
Figure 6:
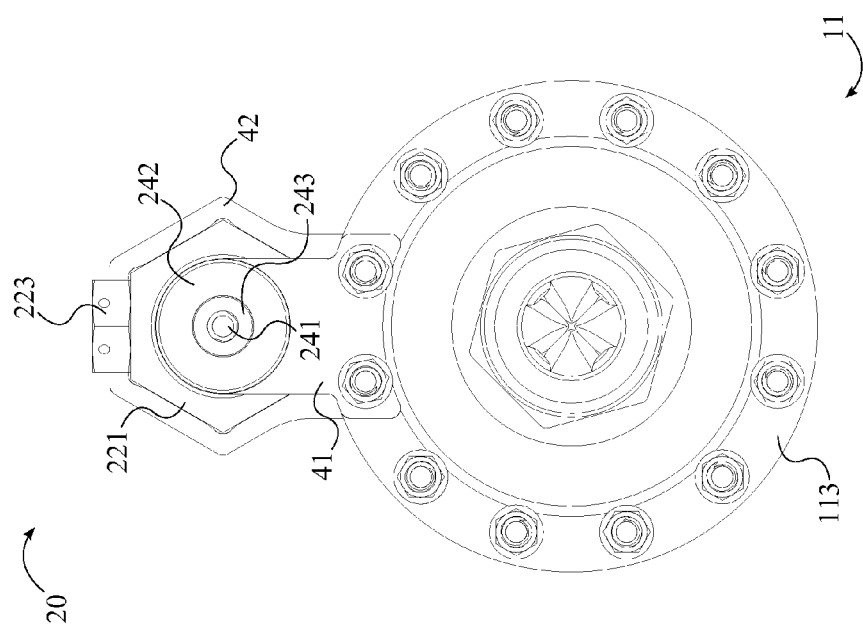
FIG. 6 is a left side elevational view of the present invention.

Both the first valve adapter 113 and the second valve adapter 114 provide the end sections of the valve housing 11, as depicted in FIG. 6-7. As such, the first valve adapter 113 is adjacently connected to the valve body 112 and the second valve adapter 114 is adjacently connected to the valve body 112 opposite the first valve adapter 113, as shown in FIG. 4. The first valve adapter 113 and the second valve adapter 114 each have a threaded end for connecting the valve assembly 10 into the desired flow path that is to be controlled. It is also possible for any other means of connection to be provided by the first valve adapter 113 and the second valve adapter 114.

In reference to FIG. 11-14, the valve housing 11 further comprises a first adapter ring 115 and a second adapter ring 116. The first adapter ring 115 is positioned in between the first valve adapter 113 and the valve body 112, and creates a fluid tight seal between the first valve adapter 113 and the valve body 112. Similarly, the second adapter ring 116 is positioned in between the second valve adapter 114 and the valve body 112, and creates a fluid tight seal between the second valve adapter 114 and the valve body 112. Preferably, the first adapter ring 115 and the second adapter ring 116 are rubber o-rings, however, any other material or seal mechanism can be used.

In reference to FIG. 12 and FIG. 14, the poppet valve 13 is positioned within the valve body 112 and comprises a valve stem 131 and a valve spool 132. The valve stem 131 is concentrically connected to the valve body 112, wherein the fluid channel 12 traverses through the valve body 112 and the valve stem 131, such that the poppet valve 13 is in fluid communication with the actuator housing 22. In the preferred embodiment of the present invention, the first valve adapter 113 and the second valve adapter 114 are tapered away from the valve body 112, such that incoming flow is directed around the central portion of the valve body 112 and the poppet valve 13 and the outgoing flow converges before exiting the valve housing 11. The valve spool 132 is slidably connected to the valve stem 131, wherein the hydraulic fluid 30 acts on the valve spool 132 in order to position the valve spool 132 along the valve stem 131.

In further reference to FIG. 12 and FIG. 14, in the preferred embodiment of the present invention there is a fluid tight cavity present between the valve stem 131 and the valve spool 132. The fluid channel 12 traverses centrally through the valve stem 131 and branches off to the fluid tight cavity. As the hydraulic fluid 30 in the actuator housing 22 and the fluid channel 12 is displaced, the hydraulic fluid 30 acts on the valve spool 132, pushing the valve spool 132 from the closed position to the open position. As the hydraulic fluid 30 acts on the valve spool 132, the valve spool 132 traverses along the valve stem 131 and the volume of the fluid tight cavity increases correspondingly, allowing more hydraulic fluid 30 to be displaced.

In reference to FIG. 11-12, in the closed position, the valve spool 132 is positioned about the valve stem 131 adjacent to the valve body 112, and is positioned into the valve body 112. The valve housing 11 further comprises a seat ring 117 that is positioned concentrically within the valve body 112. When in the closed position, the seat ring 117 is positioned in between the valve body 112 and the valve spool 132, wherein a fluid tight seal is formed in between the valve body 112 and the valve spool 132. In reference to FIG. 13-14, in the open position, the valve spool 132 is positioned along the valve stem 131 opposite the valve body 112, such that the valve spool 132 is positioned out of the valve body 112 allowing fluid to pass through the valve body 112 and around the valve spool 132. Preferably, the seat ring 117 is a rubber o-ring, however, any other material or seal mechanism can be used.

In reference to FIG. 11-14, the poppet valve 13 further comprises a first poppet ring 133 and a second poppet ring 134. The first poppet ring 133 is positioned in between the valve spool 132 and the valve body 112, and creates a fluid tight seal between the valve spool 132 and the valve body 112. Contrary to the seat valve, the first poppet ring 133 is positioned within the valve spool 132. Similar to the first poppet ring 133, the second poppet ring 134 is positioned in between the valve spool 132 and the valve stem 131, and creates a fluid tight seal between the valve spool 132 and the valve stem 131. Both the first popper ring and the second poppet ring 134 prevent the hydraulic fluid 30 from leaking from the fluid tight cavity into the valve housing 11. Preferably, the first poppet ring 133 and the second poppet ring 134 are rubber o-rings, however, any other material or seal mechanism can be used.

The valve assembly 10 further comprises a pressure pass-through fitting 14 and a plurality of fitting rings 15. In reference to FIG. 4 and FIG. 11, the pressure pass-through fitting 14 is adjacently connected to both the valve housing 11 and the actuator housing 22, wherein the pressure pass-through fitting 14 is positioned in between the valve housing 11 and the actuator housing 22. More specifically, the pressure-pass through fitting is connected to the actuator spool body 221 and the valve body 112. The pressure pass-through fitting 14 serves as the conduit for passing the hydraulic fluid 30 between the actuator and the valve body 112. As such, the fluid channel 12 traverses through the pressure pass-through fitting 14, wherein the valve housing 11 and the actuator housing 22 are in fluid communication with each other.

In reference to FIG. 11 and FIG. 13, the plurality of fitting rings 15 are positioned around the pressure pass-through fitting 14. Additionally, the plurality of fitting rings 15 is positioned opposite each other along the pressure pass-through fitting 14, wherein the plurality of fitting rings 15 is positioned in between the pressure pass-through fitting 14 and the valve spool 132 body, and in between the pressure-pass through fitting and the valve body 112. The plurality of fitting rings 15 creates a fluid tight seal between the pressure pass-through fitting 14 and the valve spool 132 body, and between the pressure pass-through fitting 14 and the valve body 112. Preferably each of the plurality of fitting rings 15 is a rubber o-ring, however, any other material or seal mechanism can be used.

The actuator mounting assembly 40 is adjacently connected to the valve housing 11 and provides a means for attaching the actuating mechanism 20 to the valve assembly 10. The actuator mounting assembly 40 comprises a first actuator mounting bracket 41 and a second actuator mounting bracket 42. The first actuator mounting bracket 41 and the second actuator mounting bracket 42 are adjacently connected to the valve housing 11. The actuator housing 22 is perimetrically connected to the first actuator mounting bracket 41 and the second actuator mounting bracket 42 opposite the valve housing 11, wherein the first actuator mounting bracket 41 and the second actuator mounting bracket 42 each encircle the actuator housing 22, as shown in FIG. 1. This ensures that the actuating mechanism 20 remains in the desired position (i.e. being aligned with the valve housing 11), ensuring a fluid tight connection between the actuator housing 22 and the valve housing 11 through the pressure pass-through fitting 14. Other connector types may also be used to attach the actuating mechanism 20 to the valve assembly 10.

In reference to FIG. 4, in the preferred embodiment of the present invention, the first actuator mounting bracket 41 and the second actuator mounting bracket 42 are positioned opposite each other along the actuating mechanism 20. The first actuator mounting bracket 41 is connected to the first valve adapter 113, while the second actuator mounting bracket 42 is connected to the second valve adapter 114. The pressure pass-through fitting 14 is positioned in between the first actuator mounting bracket 41 and the second actuator mounting bracket 42, and traverses into the second chamber 2212 of the actuator spool body 221.

When the actuating mechanism 20 is fired, the hydraulic fluid 30 within the actuator spool body 221 and the fluid channel 12 of the valve assembly 10 is displaced. The displaced hydraulic fluid 30 acts on the valve spool 132, moving the valve spool 132 along the valve stem 131 within the valve body 112. When in the closed position, a fluid tight seal is formed between the valve spool 132 and the seat ring 117 positioned around a central passage of the valve body 112, as shown in FIG. 11-12. As the valve spool 132 moves along the valve stem 131, the valve spool 132 is separated from the seat ring 117, opening the central passage through the valve body 112, as shown in FIG. 13-14. Once the poppet valve 13 has been opened, fluid can then freely pass through the valve housing 11. If for some reason the pressure within the actuator spool body 221 or the fluid channel 12 of the valve assembly 10 is too high, then the burst disk 111 will break, allowing the hydraulic fluid 30 to leak out of the valve body 112.

In order to reset the poppet valve 13 to the closed position, the user must first pull the ball detent locking ring 244 away from the actuator spool body 221. This compresses the lock spring 246 and allows the plurality of locking balls 245 to move away from the number of grooves in the locking rod 231. Once the ball detent locking ring 244 has been pulled away, the user then pushes the locking indicator 243 back into the actuator spool body 221 to the position shown in FIG. 11. This in turn forces the piston 23 back into the unfired position. The piston 23 stroke may be designed such that the piston 23 fully returns to its original position or only partially returns. When the line to which the valve assembly 10 is installed is pressurized, the poppet valve 13 will return to the closed position. If the piston 23 of the actuating mechanism 20 is not fully reset, then the closing of the poppet valve 13 will force hydraulic fluid 30 into the actuator spool body 221, fully resetting the piston 23.

Although the invention has been explained in relation to its preferred embodiment, it is to be understood that many other possible modifications and variations can be made without departing from the spirit and scope of the invention as hereinafter claimed.

What is claimed is:

1. A locking poppet valve comprises:
   a valve assembly;
   an actuating mechanism;
   a hydraulic fluid isolated from a fluid flows through the valve assembly;
   wherein:
     the valve assembly comprises a valve housing, a fluid channel, and a poppet valve;
     the valve housing comprises a valve body;
     the poppet valve comprises a valve stem and a valve spool;
     the valve stem being concentrically connected to the valve body;
     the fluid channel traversing through the valve stem; and
     the valve spool being slidably connected to the valve stem, wherein the hydraulic fluid acts on the valve spool;
     the actuating mechanism comprises an actuator housing, a piston, and a locking mechanism;
     the piston comprises a locking rod and an actuator spool;
     the actuator housing being adjacently connected to the valve housing;
     the poppet valve being positioned within the valve housing;
     the fluid channel traversing through the valve housing;
     the actuator housing being in fluid communication with the poppet valve through the fluid channel;
     the actuator housing and the fluid channel being filled with the hydraulic fluid;
     the locking mechanism being mechanically coupled to the actuator housing and configured to engage the locking rod;
     the locking mechanism comprises a ball detent locking ring and a plurality of locking balls;
     the ball detent locking ring being slidably positioned around the actuator housing;

the plurality of locking balls traversing through the actuator housing; and the plurality of locking balls being positioned around the actuator housing adjacent to the ball detent locking ring;

the piston being slidably positioned within the actuator housing;

the piston being positioned adjacent to the locking mechanism; and the actuator spool being concentrically connected to the locking rod opposite the locking mechanism.

2. The locking poppet valve as claimed in claim 1, wherein:
the valve housing comprises a burst disk and a valve body;
the fluid channel traversing through the valve body;
the burst disk being fluidly connected to the fluid channel; and
the burst disk being perimetrically connected to the valve body.

3. The locking poppet valve as claimed in claim 1, wherein:
the valve housing comprises a valve body, a first valve adapter, and a second valve adapter;
the first valve adapter being adjacently connected to the valve body; and
the second valve adapter being adjacently connected to the valve body opposite the first valve adapter.

4. The locking poppet valve as claimed in claim 1, wherein:
the valve spool being positioned about the valve stem adjacent to the valve body; and
the valve spool being positioned into the valve body, wherein a fluid tight seal is formed between the valve spool and the valve body.

5. The locking poppet valve as claimed in claim 1, wherein:
the valve assembly further comprises a pressure pass through fitting;
the pressure pass through fitting being positioned in between and adjacently connected to the valve housing and the actuator housing; and
the fluid channel traversing through the pressure pass through fitting.

6. The locking poppet valve as claimed in claim 1, further comprises:
an actuator mounting assembly comprises a first actuator mounting bracket and a second actuator mounting bracket;
the first actuator mounting bracket and the second actuator mounting bracket being adjacently connected to the valve housing; and
the actuator housing being perimetrically connected to the first actuator mounting bracket and the second actuator mounting bracket opposite the valve housing.

7. The locking poppet valve as claimed in claim 1, wherein:
the locking mechanism comprises a locking indicator;
the locking indicator being positioned into the actuator housing; and
the locking indicator being slidably connected to the actuator housing.

8. The locking poppet valve as claimed in claim 7, wherein:
the locking mechanism further comprises a plurality of locking balls;

the locking indicator being positioned adjacent to the plurality of locking balls; and
the locking indicator engaging the plurality of locking balls.

9. The locking poppet valve as claimed in claim 7, wherein:
the locking mechanism further comprises a plurality of locking balls;
the locking rod engaging the locking indicator; and
the plurality of locking balls engaging the locking rod.

10. The locking poppet valve as claimed in claim 7, wherein:
the locking mechanism comprises a ball detent locking ring, a ball detent locking cap, and a lock spring;
the ball detent locking cap being positioned onto the actuator housing adjacent to the ball detent locking ring;
the lock spring being positioned around the actuator housing; and
the lock spring being positioned in between the ball detent locking cap and the ball detent locking ring.

11. The locking poppet valve as claimed in claim 1, wherein:
the actuating mechanism further comprises an initiator;
the initiator being adjacently connected to the actuator housing opposite the locking mechanism; and
the piston being positioned in between the initiator and the locking mechanism.

12. The locking poppet valve as claimed in claim 11, wherein:
the initiator comprises a glow plug and an initiator burst disk;
the initiator burst disk being positioned on the initiator opposite the actuator housing; and
the glow plug being positioned in between the initiator burst disk and the actuator housing.

13. A locking poppet valve comprises:
a valve assembly;
an actuating mechanism;
a hydraulic fluid isolated from a fluid flows through the valve assembly;
the valve assembly comprises a valve housing, a fluid channel, a poppet valve, and a pressure pass through fitting;
the actuating mechanism comprises an actuator housing, a piston, and a locking mechanism;
the valve housing comprises a valve body, a first valve adapter, a second valve adapter, and a burst disk;
the poppet valve comprises a valve stem and a valve spool;
the piston comprises a locking rod and an actuator spool;
the locking mechanism is configured to engage the locking rod, comprises a ball detent locking ring, a plurality of locking balls, a ball detent locking cap, a lock spring, and a locking indicator;
the pressure pass through fitting being positioned in between and adjacently connected to the valve housing and the actuator housing;
the poppet valve being positioned within the valve housing;
the valve stem being concentrically connected to the valve body;
the valve spool being slidably connected to the valve stem, wherein the hydraulic fluid acts on the valve spool;
the fluid channel traversing through the pressure pass-through fitting, the valve body, and the valve stem;

the burst disk being fluidly connected to the fluid channel;
the burst disk being perimetrically connected to the valve body;
the first valve adapter being adjacently connected to the valve body;
the second valve spool adapter being adjacently connected to the valve body opposite the first valve adapter;
the actuator housing being in fluid communication with the poppet valve through the fluid channel;
the actuator housing and the fluid channel being filled with the hydraulic fluid;
the ball detent locking ring being slidably positioned around the actuator housing;
the plurality of locking balls traversing through the actuator housing;
the plurality of locking balls being positioned around the actuator housing adjacent to the ball detent locking ring;
the ball detent locking cap being positioned onto the actuator housing adjacent to the ball detent locking ring;
the lock spring being positioned around the actuator housing; the lock spring being positioned in between the ball detent locking cap and the ball detent locking ring;
the locking indicator being positioned into the actuator housing;
the locking indicator being slidably connected to the actuator housing;
the piston being slidably positioned within the actuator housing;
the piston being positioned adjacent to the locking mechanism; and
the actuator spool being concentrically connected to the locking rod opposite the locking mechanism.

14. The locking poppet valve as claimed in claim 13, wherein:
the valve spool being positioned about the valve stem adjacent to the valve body; and
the valve spool being positioned into the valve body, wherein a fluid tight seal is formed between the valve spool and the valve body.

15. The locking poppet valve as claimed in claim 13, wherein:
an actuator mounting assembly;
the actuator mounting assembly comprises a first actuator mounting bracket and a second actuator mounting bracket;
the first actuator mounting bracket and the second actuator mounting bracket being adjacently connected to the valve housing; and
the actuator housing being perimetrically connected to the first actuator mounting bracket and the second actuator mounting bracket opposite the valve housing.

16. The locking poppet valve as claimed in claim 13, wherein:
the locking indicator being positioned adjacent to the plurality of locking balls; and
the locking indicator engaging the plurality of locking balls.

17. The locking poppet valve as claimed in claim 13, wherein:
the locking rod engaging the locking indicator; and
the plurality of locking balls engaging the locking rod.

18. The locking poppet valve as claimed in claim 13, wherein:
the actuating mechanism further comprises an initiator;
the initiator comprises a glow plug and an initiator burst disk;
the initiator being adjacently connected to the actuator housing opposite the locking mechanism;
the piston being positioned in between the initiator and the locking mechanism;
the initiator burst disk being positioned on the initiator opposite the actuator housing; and
the glow plug being positioned in between the initiator burst disk and the actuator housing.

* * * * *